(12) United States Patent
Sreedharan et al.

(10) Patent No.: US 8,141,079 B2
(45) Date of Patent: Mar. 20, 2012

(54) DYNAMIC APPLICATION SCHEDULER IN A POLLING SYSTEM

(75) Inventors: Praseeth Sreedharan, Santa Clara, CA (US); Sreedharan Sreejith, Santa Clara, CA (US)

(73) Assignee: Samsung Electronics Co., Ltd., Suwon-si (KR)

(*) Notice: Subject to any disclaimer, the term of this patent is extended or adjusted under 35 U.S.C. 154(b) by 1151 days.

(21) Appl. No.: 11/770,558

(22) Filed: Jun. 28, 2007

(65) Prior Publication Data
US 2009/0007123 A1 Jan. 1, 2009

(51) Int. Cl.
*G06F 9/46* (2006.01)
(52) U.S. Cl. ......... 718/102; 718/100; 718/103; 718/108
(58) Field of Classification Search .................... None
See application file for complete search history.

(56) References Cited

U.S. PATENT DOCUMENTS

| 5,012,409 A * | 4/1991 | Fletcher et al. ............... 718/103 |
| 6,757,897 B1 * | 6/2004 | Shi et al. ....................... 718/102 |

* cited by examiner

*Primary Examiner* — Kenneth Tang

(57) ABSTRACT

A dynamic scheduling system is provided that comprises a processor, a polling task, a work task, and a scheduler assistant task. The polling task is configured for execution by the processor, wherein the polling task executes during a first CPU time window and sleeps during a second CPU time window. The work task is configured for an execution during the second CPU time window. The scheduler assistant (SA) task has an execution state to indicate to the polling task a status of the execution of the work task to the polling task. The SA task is configured to run if the work task runs to completion within the second CPU time window.

17 Claims, 5 Drawing Sheets

DYNAMIC APPLICATION SCHEDULER IN A POLLING SYSTEM

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Application scheduling at a communications device is typically based on an underlying onboard operating system (OS). Due to the time-sensitive nature, real-time OSs such as VxWork are often used in communication devices such as an IP router to ensure central tasks such as packet routing are done in a way that meets real-time requirements. These requirements may include, for example, guaranteed throughput, packet delay, delay variation and jitter, among others.

There are typically two general approaches to application scheduling commonly found in real time OS and general-purpose OSs. One is an interrupt-based scheduling and the other is a polling based scheduling. For an interrupt-based approach, every time an event occurs that needs processing, an OS interrupt is generated to wake up a task to process the event. Otherwise, the assigned task is in a waiting state and does not take up any CPU cycle. On the other hand, the polling based system typically assigns a highest priority to a dedicated task, referred to as the polling task, and the polling task is assigned a high percentage of CPU cycles and has the privilege to preempt any other lower-priority tasks to ensure that a critical job is done in a way that meets the real-time requirements.

The priority-based polling approach to application scheduling is commonly found in real-time OSs. In this approach, a high-priority polling task can be dedicated to a critical function such as packet forwarding in an attempt to achieve real-time requirements.

A task in an application scheduling system refers to an application or process that has been loaded into the operating system and is either being executed or waiting in a task queue to be executed. In a priority-based application scheduling system, a task has an assigned priority that determines its position in a waiting queue relative to other tasks. The term task scheduling and the term application schedule are used interchangeably in the present disclosure, unless otherwise specified.

SUMMARY

In one embodiment, a dynamic scheduling system is provided that comprises a processor, a polling task, a work task, and a scheduler assistant task. The polling task is configured for execution by the processor, wherein the polling task executes during a first CPU time window and sleeps during a second CPU time window. The work task is configured for an execution during the second CPU time window. The scheduler assistant (SA) task has an execution state to indicate to the polling task a status of the execution of the work task to the polling task. The SA task is configured to run if the work task runs to completion within the second CPU time window.

In one embodiment, a method for adjusting application schedule is provided. The method includes scheduling a high-priority task configured with a run time window and a sleep time window and executing the high priority task during the run time window. In addition, the method includes executing a low-priority task during the sleep time window and creating a scheduler-assistant (SA) task configured to have a sleep execution state if the low-priority task fails to run to completion and a ran execution state if the low-priority task runs to completion. The method also includes shrinking the run time window if the SA task has the sleep state.

In still another embodiment, a system for application task scheduling is provided that includes a plurality of SA tasks, a polling task, and a SA task manager library. Each of the plurality of scheduler assistant (SA) tasks is configured with an execution state related to an execution status of one or more of associated work tasks. The polling task is configured with a run time window and a sleep time window, the run time window adjustable based on a value of the SA task's execution state. The SA task manager library is used by the polling task to manage an association between one of the SA tasks and one or more of the associated work tasks.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In a priority-based scheduling system such as the one found in the real-time operating system VxWorks, a dedicated polling task with a highest priority is used to perform such central task as packet forwarding at an IP router. For this purpose, it is typical that the polling task is assigned 95% of CPU cycles and the reaming 5% of CPU cycles are left for other lower-priority tasks. In addition, the polling task may preempt any other task executing during the remaining 5% of CPU cycles. Such an application scheduling system is adequate under normal traffic conditions where the packet rate is steady and the vast majority of processing is related to packet forwarding at the IP router. However, under heavy traffic conditions, lower-priority task may have to wait for a long time before it can complete its execution. This may cause a problem for some low-priority, yet time-sensitive applications such as a control plane task responsible for routing table updates at the IP router. By the time the task responsible for updating the routing table gets its chance to update the routing table, it may be already too late, because the incorrect, out-of-date routing information may have been used in routing packets. To address this issue, the present disclosure provides a scheduler assistant (SA) task created with a priority lower than that of a polling task. The priority of the SA task is also lower than that of time-sensitive tasks such as a task for updating a routing table in order for the SA to be placed behind the time-sensitive tasks in a priority-based ready task queue. The polling task runs during its run time window and then sleeps during its sleep time window. The SA task runs only after lower priority tasks in front of it in the ready task queue have run to completion and before the sleep time window expires. The SA task sets its execution state according to whether it has run during the sleep time window and thus indicates to the polling task whether the lower-priority tasks have run to completion. Based on this feedback from the SA task, the polling task may adjust the run time window, the sleep time window or both, to accommodate the need of the lower-priority tasks while still meeting its own real-time requirements.

Figure 1:
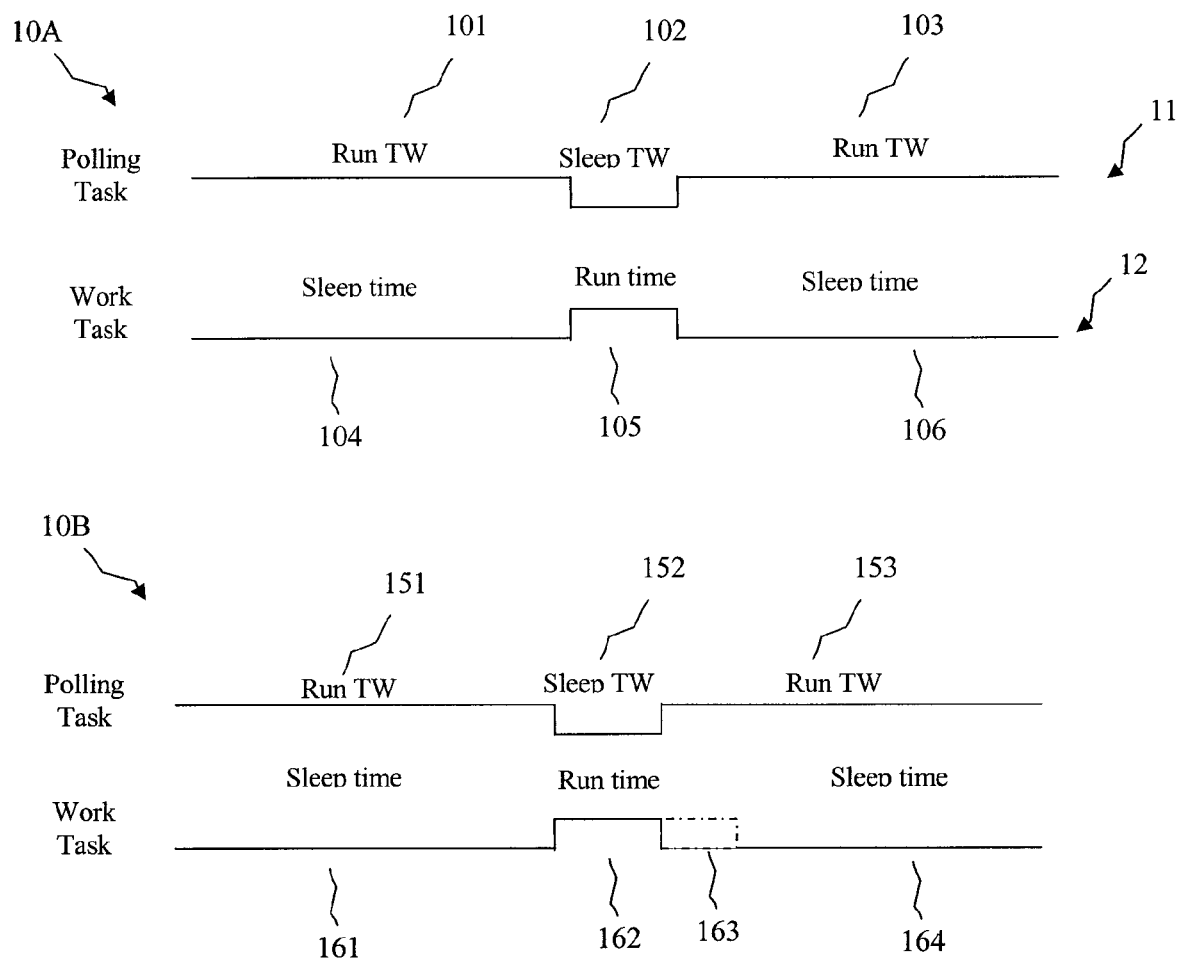
FIG. 1 illustrates time scales of application task scheduling at a communication device, according to one embodiment of the present disclosure.

FIG. 1 illustrates time scales for a high-priority polling task and a low-priority work task in a priority-based scheduling system. Two cases are illustrated, one for normal traffic condition 10A and one for heavy traffic condition 10B.

Under the normal traffic condition 10A, the traffic rate is steady and large proportion of traffic processing is related to the function assigned to the polling task such as packet forwarding. There is not any contention for CPU resource. The polling task time scale 11 shows two kinds of time windows, a run time window (TW) 101 that represents the time elapse for the polling task in execution and a sleep time window (TW) 102 for time elapse when the polling task is in sleep. During the polling task's run time windows 101, and 103, the polling task has full control of the CPU resource. A work task time scale 12 shows that the other task, a work task, has three time periods corresponding to the three time windows of the polling task. While the polling task runs during its run time window and sleeps during its sleep time window, the work task runs during the polling task's sleep time window and sleeps during the polling task's run time window. When the polling task completes its execution and enters its sleep time window 102, the work task enters its run time 105. In the normal traffic condition 10A, the work task's run time 105 fits in the polling task's sleep time window 102 and the work task runs to completion. Then, as the polling task wakes up and enters its second run-time window 103, the work task enters its second sleep time 106. The cycle consisting of a run time window and a sleep time window continues for the polling task and the work task. There is not any contention for the CPU resource.

FIG. 1 also shows the time scales 10B for the polling task and the work task under a heavy traffic condition and with a resource contention. As before, the polling task exits its first run time window 151 and enters the sleep time window 152 while the work task moves from its first sleep time 161 into its run time 162. In this example, the work task does not run to completion by the time the polling task's sleep time window 152 expires and the polling task wakes up and takes control of the CPU resource. The work task has to exit the sleep run time 162 and enters its sleep time 164. The remaining run time 163 needed for completion of the work task will have to wait for the next cycle. When traffic is heavy, the polling task may repeatedly preempt the work task, and the work task may have to wait for an extended period of time before it can complete its execution. If the heavy traffic condition persists, the resource source contention would worsen and by the time the work task completes its execution, the information may be already out of date, such as in the case where the work task is responsible for updating a routing table at an IP router. Such a scenario exists because the polling task is unaware of the fact that other lower-priority tasks are pending and may have waited for a longer period of time. The present disclosure provides a mechanism to inform the polling task of the status of the work task's last run state so that the polling task may take advantage of its high priority and adjust its run time window and/or sleep time window to provide other lower-priority tasks an opportunity to complete their execution. This mechanism can be useful for a work task that, for example, updates the routing table.

Figure 2:
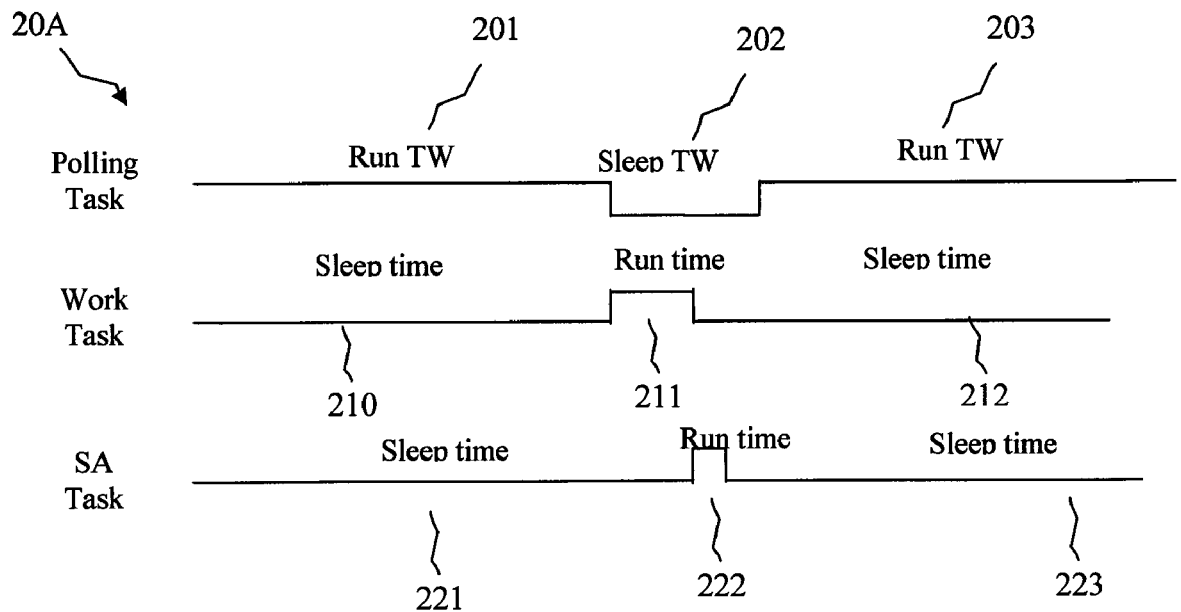
FIG. 2 illustrates time scales of application task scheduling at the communication device according to one embodiment of the present disclosure.
Figure 2:
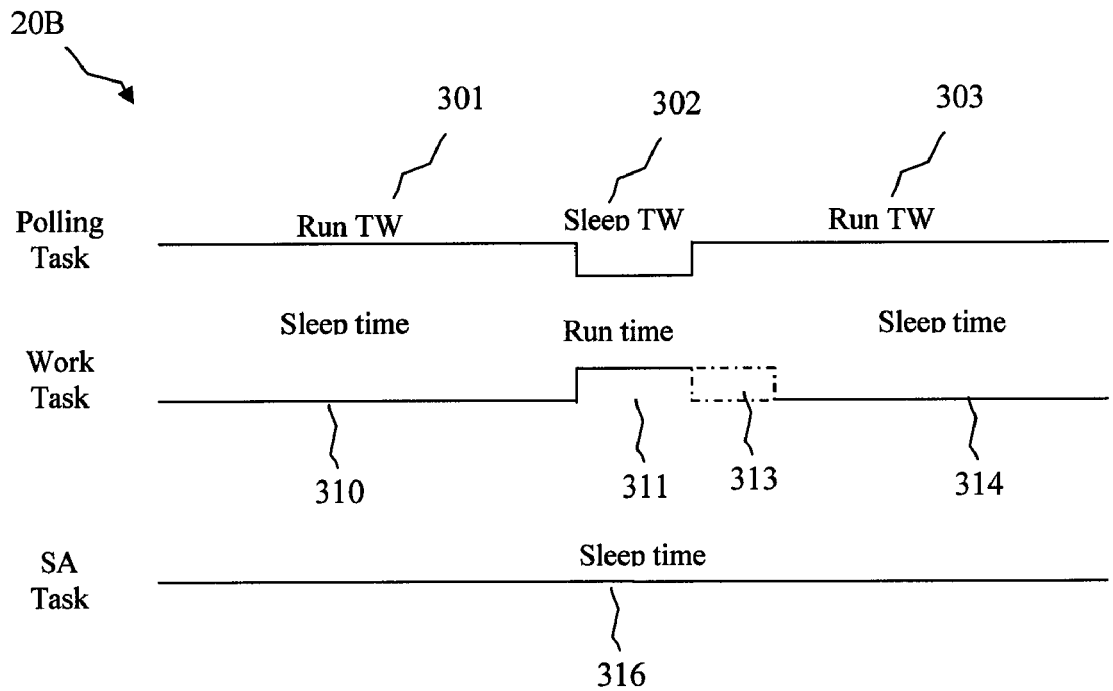

In one embodiment of the present disclosure, as shown in FIG. 2, a scheduler assistant (SA) task is provided so that the polling task is able to determine the status of the last execution of the work task so that the polling task's run time window may be adjusted to allow the lower-priority work task to proceed to completion. FIG. 2 illustrates three time scales to show how a dynamically adjustable application task scheduling system works in two exemplary cases: a case for a normal traffic condition 20A and a case for a heavy traffic condition 20B. In the case of normal traffic condition 20A, there is not a resource contention. In the case of a heavy traffic condition 20B, a resource contention arises because the work task does not complete its execution within its allotted run time and vies for more CPU time. The three time scales are for a polling task, a work task as before and an additional scheduler assistant (SA) task respectively. In one embodiment, the dynamic adjustable application scheduling system uses the SA task to provide a feedback to the polling task on the execution status of the work task.

In the case of normal traffic condition 20A and absent any resource contention, as before, when the polling task exits its run time window 201 and enter its sleep time window 202, the work task transitions from the sleep time 210 to the run time 211. Before the polling task's sleep time window expires, the work task runs to completion. The SA task wakes up from its sleep time 221 or is wakened up by the polling task or a system scheduler for example, depending on specific implementation choice. The SA task then enters a run time 222. The SA may have an associated execution state, flag, or other status indicator to indicate whether the SA task has executed. The SA state may default to "not-ran", but change to a "ran" state after execution. After the run time 222, the SA task changes its execution state before suspending itself and entering its sleep time 223. Upon the expiration of its sleep time window 202, the polling task wakes up, seizes the control and checks the execution state of the SA task. The fact that the SA task has run to completion, as indicated by the state of "ran", the polling task knows that the work task has completed its execution. In this case, the SA task's feedback to the polling task is that there is not any resource contention and the work task has run to completion. Therefore there is not a need for the polling task to make any adjustment to its run time window or the sleep time window. After checking the execution state of the SA task, the polling task or some other process sets the SA task's execution state to the original sleep or "not run" state and put the SA task in a ready task queue to monitor the execution of the work task in the next cycle.

FIG. 2 also illustrate a heavy traffic case 20B where there is a resource contention and the SA task provides a feedback to inform the polling task that the work task did not run to completion during the previous cycle. As before, as the polling task exits its run time window 301 and enters its sleep time window 302, the work task transitions from its sleep time 310 into the run time 311. However, due to a heavy workload, before the work task runs to completion, the polling task takes control of the CPU resource as its sleep time window expires. The remaining run time slice 313 needed to complete the execution of the work task would typically be completed in a later cycle. However, since the work task did not run to completion, the SA task does not get a chance to run. The execution state of the SA task is in the sleep or "not run" state either by default for the very first time or as set by the polling task in the previous cycle. Upon waking up from the sleep time window 302, the polling task enters its next run time window 303 and checks the execution state of the SA task. The polling task determines that the SA did not run, as indicated by the sleep or "not run" state and as shown by the SA time scale 316. The polling task also infers that the work task did not run to completion. Again, recall that the SA task runs after completion of the work task, within the polling task's sleep time window. The polling task may then shrink its run time window to let the work task get to its next run time sooner, extend its sleep time window to let the unfinished work task to run longer, or both.

In the present disclosure, the SA task should typically have a minimal impact on the overall system performance, because the SA task is created for the purpose of indicating to the polling task the execution status of one or more work tasks, thus the processing and workload required of the SA task is nominal, even under heavy traffic conditions.

Figure 3:
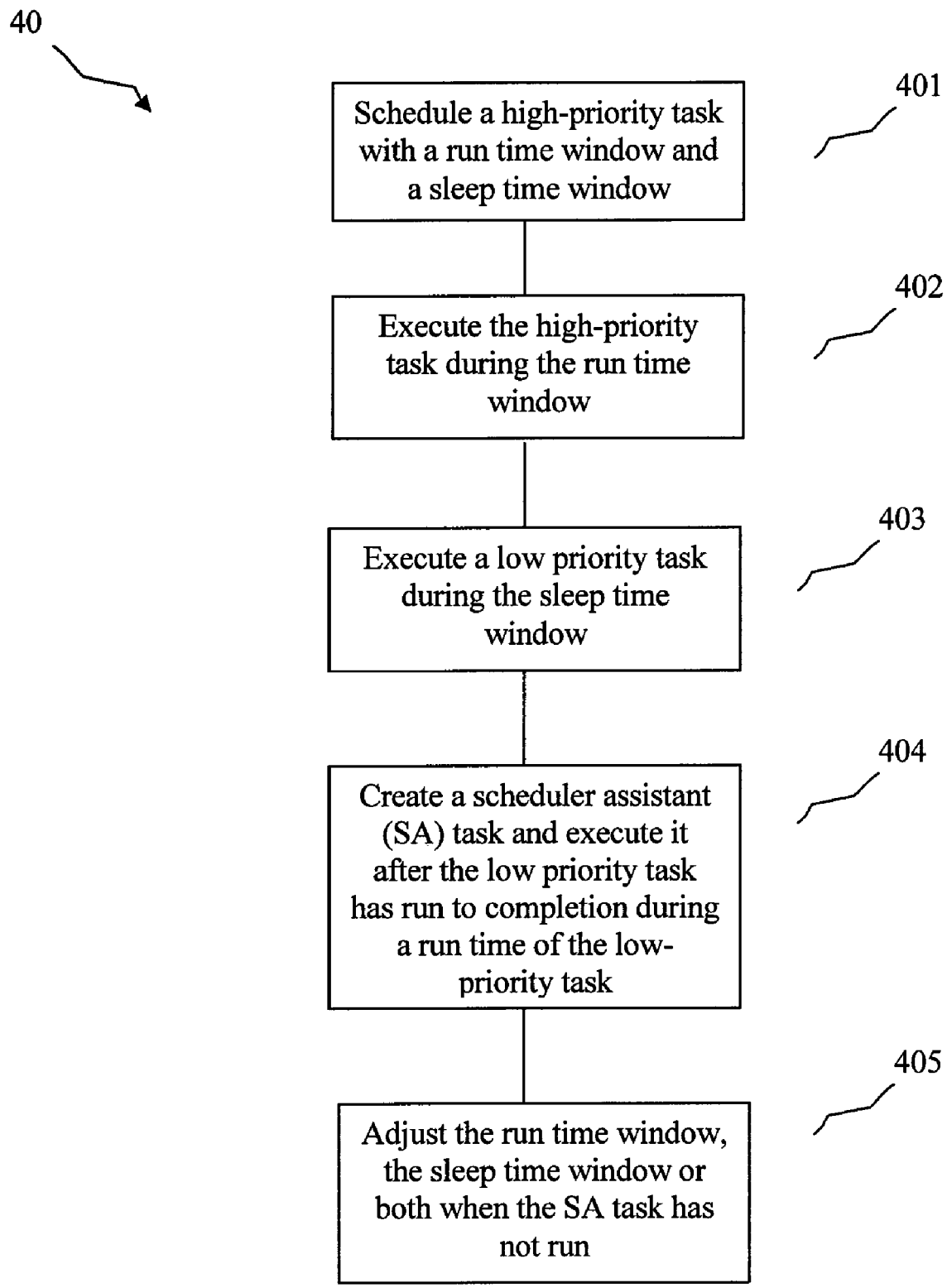
FIG. 3 is a flow chart of one embodiment of dynamic application scheduling.

FIG. 3 illustrates a method 40 for achieving dynamic application scheduling at a communication device such as an IP router. In box 401, a high-priority task such as a polling task configured with a run time window and a sleep time window, is scheduled. The initial sizes of the two windows may be determined based on a plurality of factors. The factors may include the traffic pattern on this communication device, specific customer QOS requirements, anticipated load of the polling task and the number of lower-priority tasks that run during the polling task's sleep time window. For example, the polling task performing packet routing at an IP router may take up to 95% of CPU cycles and then the remaining 5% of CPU cycles is left for other tasks. In one embodiment, the run time window and the sleep time window may be configured as 95 milliseconds and 5 milliseconds respectively.

In box 402, the polling task executes during the run time window. The polling task gives up control when its run time window expires and enters the sleep time window to allow other tasks to run.

In box 403, during the polling task's sleep time window, a low-priority work task is taken from a ready task queue and wakened by an operating system level scheduler process or a high-priority task. The work task may or may not run to completion depending on the amount of processing required by the work task and size of the polling task's sleep time window. Multiple low-priority tasks may run one after another during the polling task's sleep time window.

In box 404, a scheduler assistant (SA) task is created and its initial execution state is set to sleep. The SA task is scheduled to run within the polling task's sleep time window only after the associated work task(s) have run to completion and before the polling task sleep window expires. The SA task may have a priority lower than that of the work task the SA task is responsible for monitoring. In this way, the SA task is put behind the work task in the ready task queue. There are two possible outcomes for the SA task: run or not run. If the work task does not run to completion during the polling task's sleep time window, the SA task does not run either. In this case, the SA task retains its initial sleep state. On the other hand, if the work task does run to completion before the polling task's sleep time window expires, the SA task gets a chance to run. If the SA task executes, its execution state is set to "ran"; otherwise, it may remain at "not run".

In box 405, the polling task enters its run time window again upon the expiration of the sleep time window and gets back the control of the CPU resource. The polling task checks the state of the SA task and may find one of the two cases. In the first case, the polling task finds that the SA task has a "ran" state. This indicates that all the work tasks before the SA tasks have run to completion and the SA also ran. This suggests that none of the work tasks is waiting for more CPU time to run to completion. In this case, the polling task sets the SA state back to the original sleep state and puts the SA task in the operational state from the suspended state, behind the work tasks the SA task is designed to monitor. For the second case, the polling task may find that the SA has a sleep or "not run" execution state. This indicates that at least one of the work tasks did not run to completion and is waiting for more CPU time. In this case, the polling task may take action to shrink its run time window, expands its sleep time window or both. In one embodiment, the polling task may choose to adjust its run time window or sleep time window before it performs other assigned responsibilities, in order for the adjustment to take effect within the current run time window. In an alternative embodiment, the polling task may make the adjustment at the end of the current run time window to affect the run time window and sleep time window in the next cycle.

Although the present disclosure, in one embodiment, notes that the SA task might be monitored by the execution state, such as "run" or "not run", other flags, or techniques for monitoring or determining whether the SA task has executed may be used in other embodiments, as will readily suggest themselves to one skilled in the art in light of the present disclosure.

Figure 4:
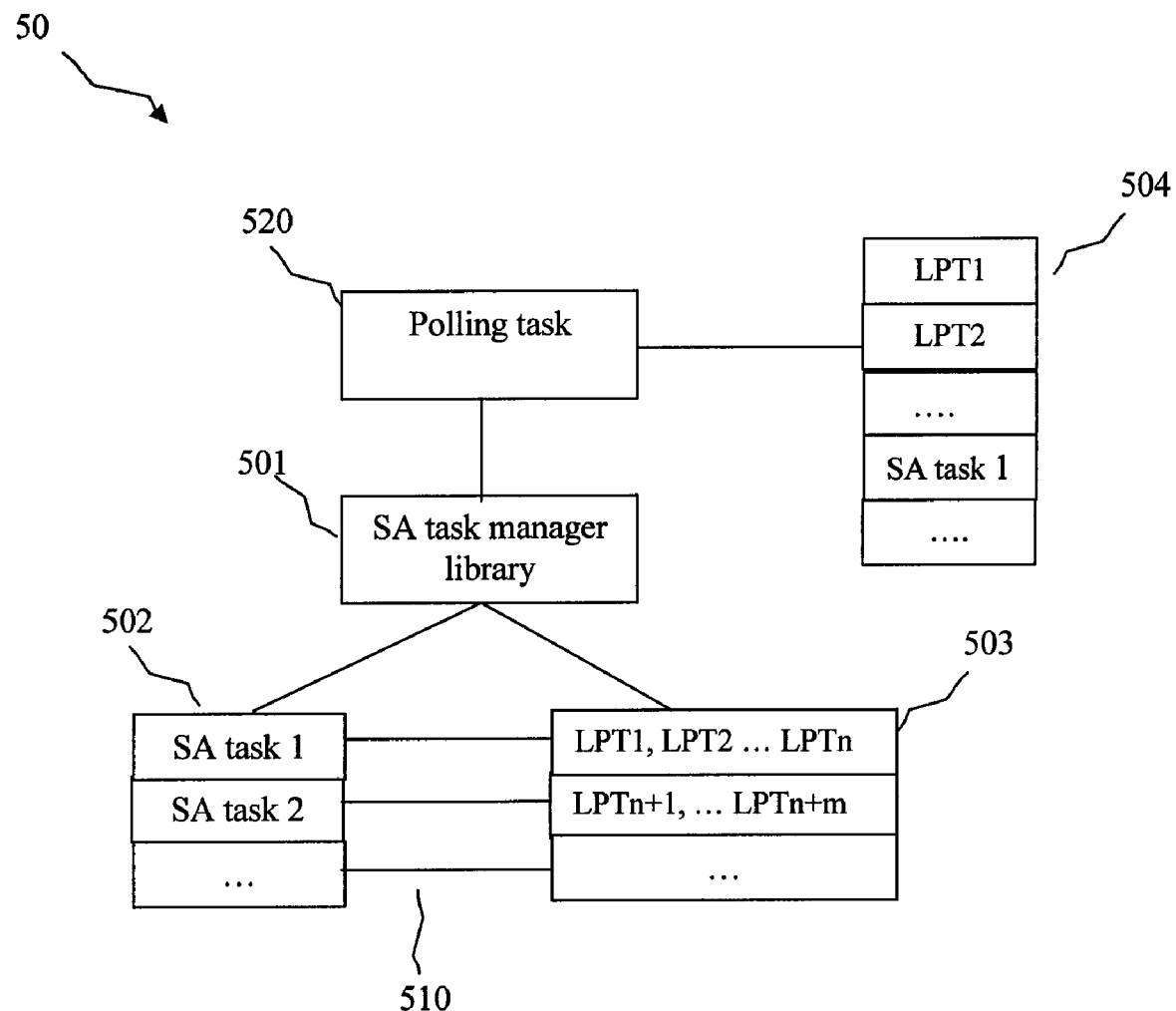
FIG. 4 illustrates an embodiment of a system for dynamic application scheduling with multiple scheduler assistant (SA) tasks.
Figure 5:
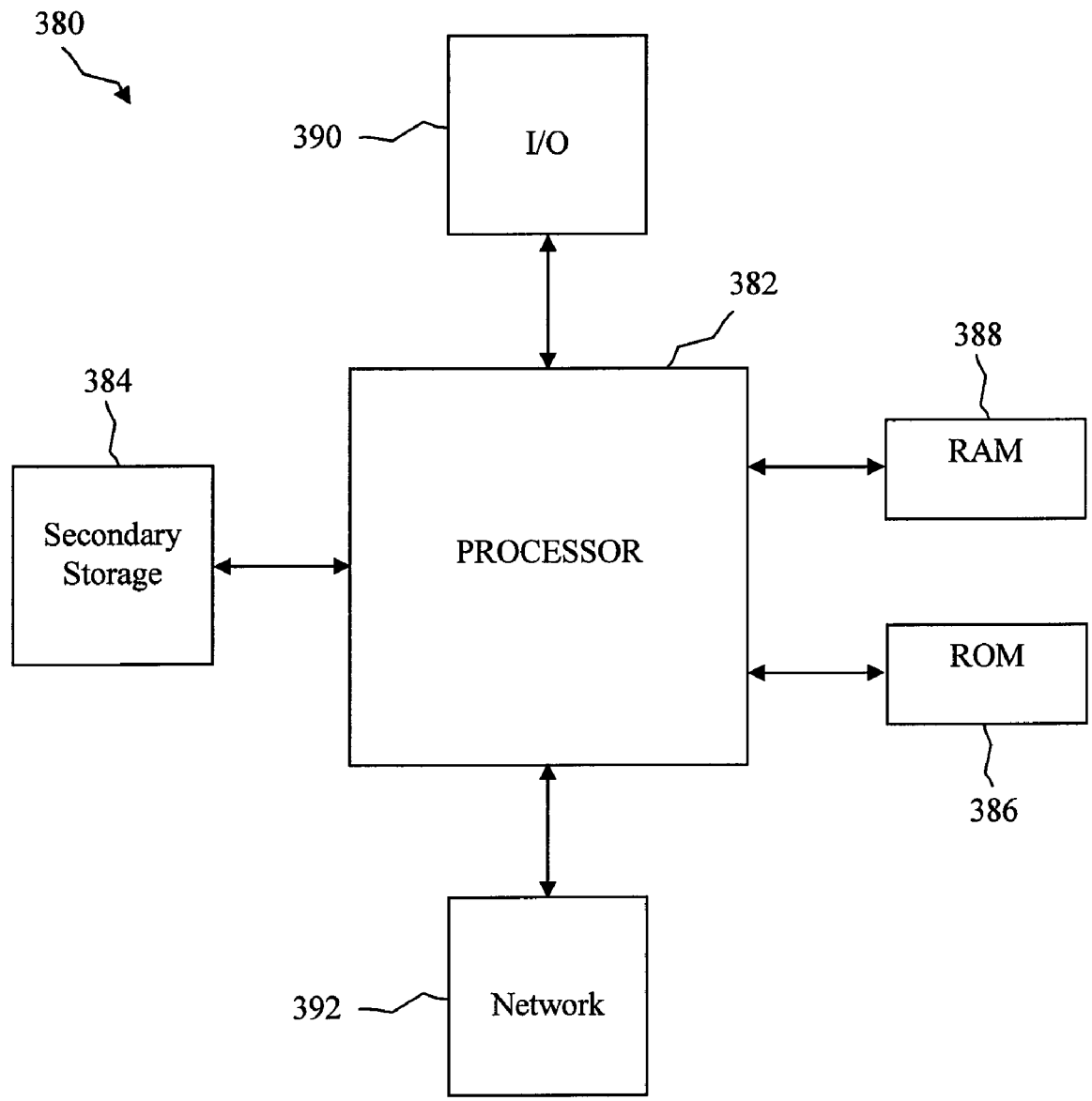
FIG. 5 illustrates an exemplary general purpose computer system suitable for implementing the several embodiments of the disclosure.

FIG. 4 illustrate a diagram 50 including multiple SA tasks where each of the multiple SA task is associated with one or a group of low-priority tasks to indicate to the polling task the execution status of the associated tasks. A SA task manager library 501 is used by the polling task 520 to manage the association 510 between a SA task stored in a SA task table 502, and a group of low priority tasks (LPT) stored in a LPT task table 503. In this case, the SA task 1 is associated with a set of low priority tasks consisting of LPT1, LPT2 . . . LPTn and is intended to indicate the execution status of these associated low-priority tasks. The polling task 520 may use the SA task manager library 501 to manage the associations. The polling task 520 is responsible for placing the SA task and the associated low-priority tasks in the ready task queue 504, according to one embodiment. The polling task 520 may use the SA task manager library 502 to create, modify, and manage or keep track of the association between each SA task and the associated tasks in the LPT task table 503. In this way, the present disclosure enables using multiple SA tasks to determine an execution status of one or more other work task or groups of work tasks.

The system described above may be implemented on any general-purpose computer with sufficient processing power, memory resources, and network throughput capability to handle the necessary workload placed upon it. FIG. 4 illustrates a general-purpose computer system suitable for implementing one or more embodiments of a router or such system or systems disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A system for application task scheduling at a communication device, comprising:
   a processor;
   a polling task configured for execution by the processor, wherein the polling task executes during a first CPU time window and sleeps during a second CPU time window;
   a work task configured for an execution during the second CPU time window; and
   a scheduler assistant (SA) task having an execution state to indicate to the polling task a status of the execution of the work task, the SA task configured to run if the work task runs to completion within the second CPU time window;
   wherein the polling task is configured to, during the first CPU time window, shrink or expand the first or second CPU time window according to the execution state of the SA task;
   wherein the SA task is configured to run for a portion of the second CPU time window, the portion sufficient for the SA task to wake up, set the execution state and suspend itself.

2. The system in claim 1, wherein the SA task execution state is one of a group consisting of ran and sleep.

3. The system of claim 1, wherein the SA task is configured to suspend itself and puts itself in a suspended task queue if it runs to completion during the second CPU time window.

4. The system of claim 1, wherein the SA task is configured to stay in a ready task queue and in a sleep execution state if the work task does not run to completion within the second CPU time window.

5. The system of claim 1 wherein the polling task is configured to move the SA task from a suspended task queue into a ready task queue upon finding that the SA task has a ran execution state.

6. The system of claim 1, where the communication device is an IP router.

7. The system of claim 1, wherein the polling task is configured with a priority higher than a priority of the SA task and higher than a priority of the work task.

8. The system of claim 1, wherein the SA task is configured with a priority lower than a priority of the work task.

9. The system of claim 1, wherein the polling task is configured to wake up a lower-priority ask and change an operation state of the lower-priority task, the lower-priority task including at least one of the SA task, the work task, and another task executing on the communication device.

10. The system of claim 1, wherein the polling task is a packet forwarding task at an IP router.

11. The system of claim 1, wherein the work task is a control plane task responsible for routing table updating at an IP router.

12. A method for adjusting application schedule, comprising:
- scheduling a high-priority task configured with a run time window and a sleep time window;
- executing the high priority task during the run time window;
- executing a low-priority task during the sleep time window;
- creating a scheduler-assistant (SA) task configured to have a sleep execution state if the low-priority task fails to run to completion and a ran execution state if the low-priority task runs to completion; and
- shrinking or expanding the run time window or the sleep time according to the execution state of the SA task;
- wherein the SA task is configured to run for a portion of the second CPU time window, the portion sufficient for the SA task to wake up, set the execution state and suspend itself.

13. The method of claim 12, further comprising configuring such that the SA task runs after the low-priority task when the low-priority task runs to completion before the sleep time window expires.

14. The method of claim 12, further comprising extending the sleep time window by the polling task if the SA task has the sleep state.

15. A system for application task scheduling at a communication device, comprising:
- a processor;
- a plurality of scheduler assistant (SA) tasks, each of the plurality of SA tasks configured with an execution state related to an execution status of one or more work tasks;
- a polling task configured with a run time window and a sleep time window, the polling task configured to shrink or expand the run time window or the sleep time window based on a value of the SA task's execution state; and
- a SA task manager library to be used by the polling task to manage an association between one of the SA tasks and one or more of the work tasks;
- wherein the SA task is configured to run for a portion of the second CPU time window, the portion sufficient for the SA task to wake up, set the execution state and suspend itself.

16. The system of claim 15, wherein each of the work tasks are configured to run during the sleep time window of the polling task.

17. The system as in claim 15, wherein the polling task is configured to extend the sleep time window if the execution state is set to sleep.

* * * * *